(12) United States Patent  
Böckem et al.

(10) Patent No.: US 10,725,179 B2  
(45) Date of Patent: Jul. 28, 2020

(54) LASER TRACKER

(71) Applicant: LEICA GEOSYSTEMS AG, Heerbrugg (CH)

(72) Inventors: Burkhard Böckem, Rieden (CH); Thomas Lüthi, Aarau (CH); Simon Fuchs, Schöftland (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 994 days.

(21) Appl. No.: 14/962,877

(22) Filed: Dec. 8, 2015

(65) Prior Publication Data

US 2016/0170024 A1 Jun. 16, 2016

(30) Foreign Application Priority Data

Dec. 12, 2014 (EP) .................................... 14197717

(51) Int. Cl.
*G01S 17/66* (2006.01)
*G01S 17/10* (2020.01)
(Continued)

(52) U.S. Cl.
CPC ............ *G01S 17/66* (2013.01); *G01S 7/4816* (2013.01); *G01S 7/4818* (2013.01);
(Continued)

(58) Field of Classification Search
CPC .... G01S 7/4816; G01S 7/4818; G01S 7/4865; G01S 17/66; G01S 17/10; G01S 17/32;
(Continued)

(56) References Cited

U.S. PATENT DOCUMENTS 5,198,877 A 3/1993 Schulz
5,973,788 A 10/1999 Pettersen et al.
(Continued)

FOREIGN PATENT DOCUMENTS

CH 706 633 A2 12/2013
DE 19610970 A1 9/1997
(Continued)

OTHER PUBLICATIONS

Maar et al. "WFD—Wave Form Digitizer Technology White Paper", (Sep. 2014).*
(Continued)

*Primary Examiner* — Eric L Bolda
(74) *Attorney, Agent, or Firm* — Maschoff Brennan

(57) ABSTRACT

Some embodiments of the invention include a coordinate measuring machine for detecting the position and alignment of a spatially movable measuring aid. The coordinate measuring machine may include a retroreflector; a base; a support, which is fixed on the base rotatably about a first rotation axis; a beam directing unit, which is fixed to the support rotatably about a second rotation axis substantially orthogonal to the first rotation axis; means for detecting a rotation angle of the support relative to the base; and means for detecting a rotation angle of the beam directing unit relative to the support. In some embodiments, the beam directing unit comprises a laser emission and reception optical unit and a first optical distance measuring unit having at least one first distance measuring device for measuring the distance to a retroreflector of the measuring aid by means of a first measurement radiation.

9 Claims, 11 Drawing Sheets

(51) Int. Cl.
| | | |
|---|---|---|
| *G01S 17/36* | (2006.01) | |
| *G01S 17/42* | (2006.01) | |
| *G01S 7/481* | (2006.01) | |
| *G01S 17/34* | (2020.01) | |
| *G01S 17/32* | (2020.01) | |
| *G01S 17/87* | (2020.01) | |
| *G01S 7/4865* | (2020.01) | |

(52) U.S. Cl.
CPC .......... *G01S 7/4865* (2013.01); *G01S 17/10* (2013.01); *G01S 17/32* (2013.01); *G01S 17/34* (2020.01); *G01S 17/36* (2013.01); *G01S 17/42* (2013.01); *G01S 17/87* (2013.01)

(58) Field of Classification Search
CPC ........ G01S 17/325; G01S 17/36; G01S 17/42; G01S 17/87
See application file for complete search history.

(56) References Cited

U.S. PATENT DOCUMENTS

| | | | |
|---|---|---|---|
| 6,324,455 B1 | 11/2001 | Jackson | |
| 7,342,650 B2 | 3/2008 | Kern et al. | |
| 7,454,265 B2 | 11/2008 | Marsh | |
| 7,671,971 B2 | 3/2010 | Aebischer et al. | |
| 7,800,758 B1 | 9/2010 | Bridges et al. | |
| 7,911,589 B2 | 3/2011 | Siercks | |
| 8,031,331 B2 | 10/2011 | Meier et al. | |
| 8,040,525 B2 * | 10/2011 | Bridges | G01B 11/002 356/3.01 |
| 8,125,629 B2 | 2/2012 | Dold et al. | |
| 8,305,563 B2 | 11/2012 | Luethi et al. | |
| 8,619,265 B2 | 12/2013 | Steffey et al. | |
| 9,036,134 B2 | 5/2015 | Steffey et al. | |
| 2006/0066836 A1 | 3/2006 | Bridges et al. | |
| 2011/0001958 A1 * | 1/2011 | Bridges | G01B 11/002 356/4.01 |
| 2012/0236320 A1 * | 9/2012 | Steffey | G01B 11/002 356/614 |
| 2014/0009604 A1 | 1/2014 | Hinderling et al. | |
| 2014/0211999 A1 | 7/2014 | Kwiatkowski | |
| 2014/0307264 A1 | 10/2014 | Luthi et al. | |
| 2015/0043007 A1 | 2/2015 | Kwiatkowski et al. | |
| 2015/0070685 A1 | 3/2015 | Koos et al. | |

FOREIGN PATENT DOCUMENTS

| | | |
|---|---|---|
| DE | 10 2012 001754 A1 | 8/2013 |
| EP | 0 553 266 A1 | 8/1993 |
| EP | 1 645 890 A1 | 4/2006 |
| EP | 1 882 959 A1 | 1/2008 |
| EP | 2 523 017 A1 | 11/2012 |
| EP | 2 557 391 A1 | 2/2013 |
| EP | 1 869 397 B1 | 5/2013 |
| EP | 2 589 982 A1 | 5/2013 |
| EP | 2 620 745 A1 | 7/2013 |
| EP | 2 634 594 A1 | 9/2013 |
| WO | 97/40342 A2 | 10/1997 |
| WO | 03/062744 A1 | 7/2003 |
| WO | 2004/036145 A1 | 4/2004 |
| WO | 2006/040263 A1 | 4/2006 |
| WO | 2007/079600 A1 | 7/2007 |
| WO | 2009/103172 A1 | 8/2009 |
| WO | 2011076907 A1 | 6/2011 |

OTHER PUBLICATIONS

European Search Report dated Jun. 2, 2015 as received in Application No. 14197717.3.
Newbury et al., "Frequency-Comb Based Approaches to Precision Ranging Laser Radar", National Institute of Standards and Technology, pp. 1-4, Jun. 23, 2011.

* cited by examiner

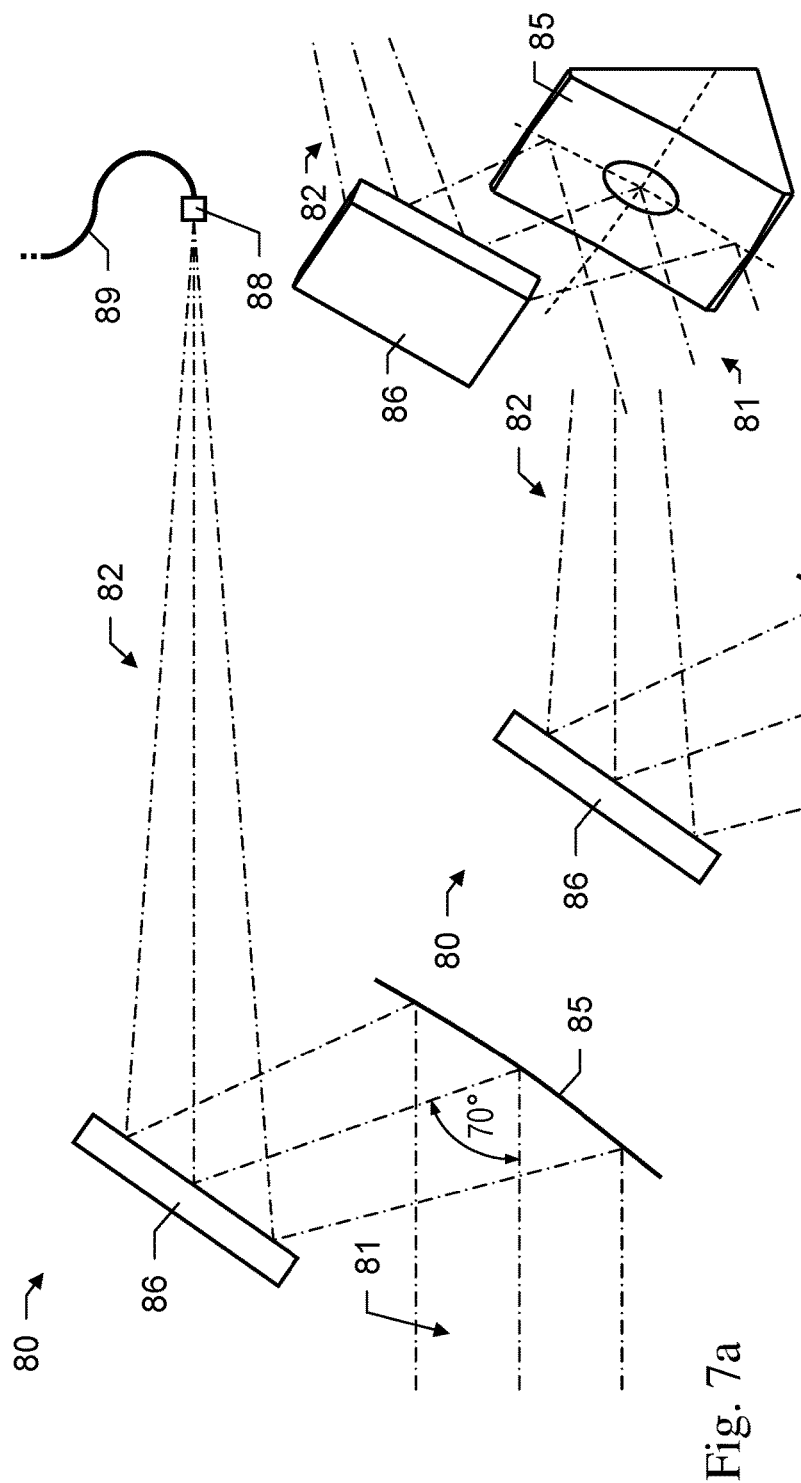
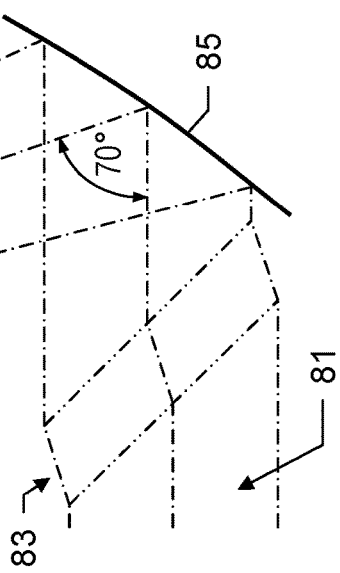
Fig. 7a
Fig. 7b
Fig. 8

LASER TRACKER

FIELD OF THE INVENTION

The invention relates to a laser tracker having at least two distance measuring devices integrated into the targeting unit, wherein a first distance measuring device is designed for continuously tracking a target point, and a second distance measuring device is designed for a distance measurement by means of a pulsed or frequency-modulated light or laser beam, in particular designed for a distance measurement by means of waveform digitizing (WFD) or as a frequency-modulated, in particular coherent, continuous wave laser (FMCW laser radar).

BACKGROUND

Measuring apparatuses designed for continuously tracking a target point and coordinatively determining the position of said point can generally be combined under the term laser tracker particularly in association with industrial measurement. In this case, a target point can be represented by a retroreflective unit (e.g. cube prism) which is targeted by an optical measurement beam of the measuring apparatus, in particular a laser beam. The laser beam is reflected back to the measuring apparatus in a parallel fashion, the reflected beam being detected by a detection unit of the apparatus. In this case, an emission direction and respectively a reception direction of the beam are ascertained, for example by means of sensors for angle measurement which are assigned to a deflection mirror or a targeting unit of the system. In addition, with the detection of the beam, a distance from the measuring apparatus to the target point is ascertained, e.g. by means of time-of-flight or phase difference measurement or by means of the Fizeau principle.

Laser trackers according to the prior art can additionally be embodied with an optical image detection unit with a two-dimensional, light-sensitive array, e.g. a CCD or CID camera or a camera based on a CMOS array, or with a pixel array sensor and with an image processing unit. In this case, the laser tracker and the camera can be mounted one on top of another in particular in such a way that their positions cannot be altered relative to one another. The camera is arranged, for example, in a manner rotatable together with the laser tracker about the substantially perpendicular axis thereof, but in a manner pivotable up and down independently of the laser tracker and thus, in particular, separately from the optical unit of the laser beam. Furthermore, the camera—e.g. depending on the respective application—can be embodied as pivotable only about one axis. In alternative embodiments, the camera can be installed in an integrated design together with the laser optical unit in a common housing.

With the detection and evaluation of an image—by means of an image detection and image processing unit—of a so-called auxiliary measuring instrument with markings whose relative position with respect to one another is known, it is thus possible to deduce an orientation of an object (e.g. a probe) arranged on the auxiliary measuring instrument in space. Together with the determined spatial position of the target point, it is furthermore possible to precisely determine the position and orientation of the object in space absolutely and/or relative to the laser tracker.

The object whose position and orientation are measured by means of the measuring instrument mentioned therefore need not be a measuring probe itself, for example, but rather can be the measuring aid. The latter, as part of the measuring system, for the measurement, is brought into a position that is mechanically defined relative to the target object or can be determined during the measurement, wherein, by means of the measured position and orientation thereof, it is possible to deduce the position and, if appropriate, the orientation of the measuring probe, for example.

Such auxiliary measuring instruments can be embodied by so-called contact sensing tools that are positioned with their contact point on a point of the target object. The contact sensing tool has markings, e.g. light points, and a reflector, which represents a target point on the contact sensing tool and can be targeted by the laser beam of the tracker, the positions of the markings and of the reflector relative to the contact point of the contact sensing tool being known precisely. The auxiliary measuring instrument can also be, in a manner known to a person skilled in the art, a, for example handheld, scanner equipped for distance measurement for contactless surface measurements, the direction and position of the scanner measurement beam used for the distance measurement relative to the light points and reflectors arranged on the scanner being known precisely. A scanner of this type is described in EP 0 553 266, for example.

For distance measurement, laser trackers from the prior art have at least one distance measuring device, wherein the latter can be embodied e.g. as an interferometer. Since such distance measuring units can measure only relative changes in distance, in addition to interferometers so-called absolute distance measuring devices are installed in present-day laser trackers. The interferometers used for distance measurement in this context use primarily—on account of the long coherence length and the measurement range made possible thereby—HeNe gas lasers as light sources. In this case, the coherence length of the HeNe laser can be a few hundred meters, such that the ranges required in industrial metrology can be obtained with relatively simple interferometer constructions. A combination of an absolute distance measuring device and an interferometer for determining distance with a HeNe laser is known from WO 2007/079600 A1, for example.

In addition, in modern tracker systems—increasingly in a standardized manner—an offset of the received measurement beam from a zero position is ascertained on a fine targeting sensor. By means of this measurable offset, it is possible to determine a difference in position between the center of a retroreflector and the impingement point of the laser beam on the reflector and it is possible to correct or readjust the alignment of the laser beam depending on this deviation in such a way that the offset on the fine targeting sensor is reduced, in particular is "zero", and the beam is thus aligned in the direction of the reflector center. As a result of the readjustment of the laser beam alignment, continuous target tracking of the target point can be carried out and the distance and position of the target point can be determined continuously relative to the measuring instrument. The readjustment can be realized in this case by means of a change in alignment of the deflection mirror provided for deflecting the laser beam, said deflection mirror being movable in a motorized manner, and/or by pivoting of the targeting unit having the beam-guiding laser optical unit.

For determining the orientation of the measuring aid, a detection direction of the camera is continuously aligned such that an image is detectable in the direction of the tracking beam of the laser tracker. The camera can furthermore have a zoom function, wherein a magnification level can be set depending on the determined distance between laser tracker and target point or measuring aid. With these two adaptation functions (alignment and magnification), the camera can thus continuously detect an image in which the measuring aid and in particular the light points of the measuring aid are imaged. An electronically evaluatable, two-dimensional image of a spatial arrangement of light points arises as a result.

An image processing unit is provided for evaluating the image. This can be used to identify the imaged light points, to determine the centroids of the imaged light points and to determine the image coordinates of said centroids, from which it is possible to calculate for example solid angles between the optical axis of the sensor, in particular the detection direction, and the direction from the sensor to the respective light points.

Such a coordinate measuring machine having a laser tracker and an image detection unit for determining the position and orientation of objects in space on which light points and reflectors are arranged is described in U.S. Pat. No. 5,973,788, for example.

With the use of such coordinate measuring machines, at least three light points that can be registered by the image detection unit and at least one reflector that reflects the measurement beam of the laser tracker are arranged at the object whose position and orientation are to be determined, in positions that are known relative to the object. The light points to be registered by the image detection unit can be active light sources (e.g. light-emitting diodes) or reflectors to be illuminated, wherein the light points are equipped or arranged in such a way that they are unambiguously distinguishable from one another.

WO 2007/079600 A1 discloses a generic laser-based coordinate measuring machine in which a light exit and light receiving optical unit of the distance measuring apparatus, a measuring camera and an overview camera are arranged on a common element, which is rotatable relative to at least two axes, and a laser beam is coupled into the distance measuring apparatus by means of an optical waveguide from a laser module fitted outside the beam directing unit.

By contrast, the measurement of distances without the use of measuring aids having a retroreflector, i.e. measurement directly to a surface of an object to be measured, is not possible with such coordinate measuring machines.

Accordingly, scanning an object surface is not possible either: in order to detect objects or surfaces, use is often made of methods which progressively scan and in the process record the topography of a structure, such as e.g. of a construction site. In this case, such a topography constitutes a continuous sequence of points which describes the surface of the object, or else a corresponding model or a description of the surface. One conventional approach is scanning by means of a laser scanner which in each case detects the spatial position of a surface point by the distance to the targeted surface point being measured by the laser and this measurement being combined with the angle information of the laser emission. From this distance and angle information, the spatial position of the detected point can be determined and the surface can be continuously measured. In many cases, in parallel with this purely geometrical detection of the surface, image recording by means of a camera is also carried out, which, besides the overall visual view, also provides further information, e.g. regarding the surface texture. WO 97/40342 describes a method which records a topography by means of scanner systems installed in a stationary manner. In addition, scanning functions can be integrated into various other instruments as additional functions. WO 2004/036145 discloses, for example, a geodetic measuring instrument which emits a laser beam for distance measurement from its position within the detected range. Such measuring instruments can likewise be modified for detecting surfaces in a scanning fashion, or be operated without modification. One example thereof is motorized theodolites or total stations.

In order to provide such measuring and scanning functionalities that are usable without a retroreflector with generic coordinate measuring machines such as laser trackers, solutions with attachment modules are known from the prior art. By way of example, the document EP 2 620 745 A1 discloses a measuring system consisting of a coordinate measuring machine, e.g. laser tracker, and a scanning module to be fixed thereto.

Measuring distances without the aid of retroreflectors is for example also possible with the distance measuring instruments described in WO 2006/040263 A1 or EP 1 869 397 B1, in which distances are ascertained by means of a frequency-modulated continuous wave radar (FMCW) or a coherent laser radar. However, these solutions lack a target tracking functionality.

However, this multi-component solution is, firstly, complex in terms of production engineering and, secondly, unwieldy and impractical for the user. It would therefore be advantageous to provide a coordinate measuring machine having both a target tracking functionality for a retroreflector and the possibility of ascertaining distances in a manner free of a measuring aid—i.e. in particular without a retroreflector.

SUMMARY

Therefore, some embodiments of the present invention provide an improved coordinate measuring machine that combines these functionalities in one machine.

Furthermore, some embodiments to provide such a coordinate measuring machine in which the structural construction is designed with less complexity and better handleability, in particular without the necessity of a modular construction of the coordinate measuring machine.

Some embodiments of the invention extend a measuring instrument according to the prior art in such a way that a scanning functionality is additionally provided for the measuring instrument.

The invention firstly relates to a coordinate measuring machine comprising a beam directing unit having a first and a second distance measuring device, wherein the measurement radiation of the first distance measuring device enables a target tracking of a retroreflector, while the measurement radiation of the second distance measuring device allows measuring of distances to surfaces that are reflective in a scattering fashion.

In this case, a first aspect of the invention relates to a laser tracker in which the second distance measuring device is designed as a WFD module for performing a waveform digitizing process.

Such a laser tracker according to the invention for position determination and in particular continuous tracking of a target embodied as a retroreflector or having at least one retroreflector comprises at least a base, a support, which is fixed on the base rotatably about a first rotation axis, a beam directing unit, which is fixed to the support rotatably about a second rotation axis, which is substantially orthogonal to the first rotation axis, means for detecting a rotation angle of the support relative to the base, and means for detecting a rotation angle of the beam directing unit relative to the support. In this case, the beam directing unit comprises a laser emission and reception optical unit for emitting measurement radiation and for receiving measurement radiation reflections, a first optical distance measuring unit having at least one first distance measuring device for measuring the distance to a retroreflector of the measuring aid by means of a first measurement radiation, and a second optical distance measuring unit comprising a second beam source for emitting a second measurement radiation, a detector and a control and processing unit for measuring a distance to a diffusely scattering surface of a target object by means of the second measurement radiation.

In accordance with the first aspect of the invention,
the second beam source is designed to emit a pulsed light radiation, in particular a laser beam, as second measurement radiation,
a portion of the second measurement radiation that is reflected from the surface of the target object is forwardable to the detector,
the detector is designed to detect at least one pulse of the reflected portion of the second measurement radiation, and
the second optical distance measuring unit is designed to digitize the detected pulse in the context of a waveform digitizing process and to ascertain a distance to the surface of the target object on the basis of the digitized pulse.

In one embodiment of the laser tracker in accordance with the first aspect of the invention, a part of the second measurement radiation is forwardable to the detector as reference beam, in particular by means of a first beam splitter provided in the beam path of the second measurement radiation in the beam directing unit.

In a further embodiment of the laser tracker in accordance with the first aspect of the invention, said laser tracker comprises a beam receiving unit, which is designed to guide reflected radiation that entered the beam directing unit through the laser emission and reception optical unit to the second optical distance measuring unit, wherein the beam receiving unit comprises a paraboloidal mirror having a parabolically designed mirror surface, and the paraboloidal mirror is designed to concentrate reflected radiation impinging on the mirror surface at a focal point, and in particular is designed to reflect reflected radiation impinging at a center of the mirror surface at an angle of 65° to 75°, in particular 70°. In this case, in particular
at the focal point a coupling-in element is provided for coupling the concentrated reflected radiation into an optical waveguide, in particular wherein a deflection element is provided in the beam path between the paraboloidal mirror and the coupling-in element, and/or
the paraboloidal mirror is arranged outside the common beam path of the first measurement radiation and the second measurement radiation, in particular wherein the beam receiving unit comprises a beam splitting apparatus arranged in the common beam path, by means of which beam splitting apparatus the reflected radiation is directed onto the paraboloidal mirror.

A second aspect of the invention relates to a laser tracker in which the second distance measuring device is designed as an FMCW module for performing a frequency evaluation of a frequency-modulated laser beam having a continuously varying frequency.

Such a laser tracker according to the invention for position determination and in particular continuous tracking of a target embodied as a retroreflector or having at least one retroreflector at least comprises a base, a support, which is fixed on the base rotatably about a first rotation axis, a beam directing unit, which is fixed to the support rotatably about a second rotation axis, which is substantially orthogonal to the first rotation axis, means for detecting a rotation angle of the support relative to the base, and means for detecting a rotation angle of the beam directing unit relative to the support. In this case the beam directing unit comprises a laser emission and reception optical unit for emitting measurement radiation and for receiving measurement radiation reflections, a first optical distance measuring unit having at least one first distance measuring device for measuring the distance to a retroreflector of the measuring aid by means of a first measurement radiation, and a second optical distance measuring unit comprising a second beam source for emitting a second measurement radiation, a detector and a control and processing unit for measuring a distance to a diffusely scattering surface of a target object by means of the second measurement radiation.

In accordance with the second aspect of the invention,
the second beam source comprises drive means and is designed to generate a frequency-modulated laser beam having a continuously varying frequency as second measurement radiation,
a part of the second measurement radiation can be split off as reference beam, in particular by means of a first beam splitter provided in the beam path of the second measurement radiation in the beam directing unit,
a portion of the second measurement radiation that is reflected from the surface of the target object is forwardable to the detector and
the second optical distance measuring unit is designed to ascertain, on the basis of a frequency evaluation of the reference beam and the measurement radiation reflection, a distance to the surface of the target object.

In particular, ascertaining the distance is based on the principle of the evaluation of a phase difference between the frequency modulation of the reference signal and the frequency modulation of the reflected measurement radiation signal.

In one embodiment of the laser tracker in accordance with the second aspect of the invention, the second optical distance measuring unit comprises a mixer, wherein the reference beam and the reflected measurement radiation reflection are forwardable to the mixer, and the mixer is designed for carrying out a homodyne or heterodyne mixing method. In this case, the second optical distance measuring unit comprises, in particular, a low-pass filter disposed downstream of the mixer.

In a further embodiment of the laser tracker in accordance with the second aspect of the invention, the second optical distance measuring unit comprises an optical reference system having a first optical fiber, a second optical fiber and a reference beam detector, wherein the first and second optical fibers in each case have a known, mutually different length, and the reference beam is forwardable to the optical reference system. The two lengths differ from one another in particular in a ratio of at least 2:1.

A third aspect of the invention relates to a laser tracker in which the first or second distance measuring device is designed for distance measurement by means of a frequency comb.

Such a laser tracker according to the invention for position determination and in particular continuous tracking of a target embodied as a retroreflector or having at least one retroreflector, at least comprises a base, a support, which is fixed on the base rotatably about a first rotation axis, a beam directing unit, which is fixed to the support rotatably about a second rotation axis, which is substantially orthogonal to the first rotation axis, means for detecting a rotation angle of the support relative to the base, and means for detecting a rotation angle of the beam directing unit relative to the support. In this case, the beam directing unit comprises a laser emission and reception optical unit for emitting measurement radiation and for receiving measurement radiation reflections, a first optical distance measuring unit having at least one first distance measuring device for measuring the distance to a retroreflector of the measuring aid by means of a first measurement radiation, and a second optical distance measuring unit comprising a second beam source for emitting a second measurement radiation, a detector and a control and processing unit for measuring a distance to a diffusely scattering surface of a target object by means of the second measurement radiation.

In accordance with the third aspect of the invention, the first optical distance measuring unit and/or the second optical distance measuring unit are/is designed for a frequency-comb-based or frequency-comb-supported distance measurement.

One embodiment of the laser tracker according to the invention comprises a scanning functionality, in the context of which the laser tracker is designed to carry out, by means of the second measurement radiation, a multiplicity of distance measurements with respect to a multiplicity of measurement points on the surface of the measurement object, wherein the control and processing unit is designed in such a way that for the multiplicity of the distance measurements, the rotation angles respectively detected are linked with the measured distance, such that a point position is in each case defined by the linking, and a point cloud comprising a number of the point positions is generatable.

A further embodiment of the laser tracker according to the invention comprises a calibration functionality for calibrating the first optical distance measuring unit and/or the second optical distance measuring unit, wherein the control and processing unit is designed in such a way that the first measurement radiation and the second measurement radiation are emittable in a temporal relationship, in particular simultaneously, onto a retroreflector, and the first optical distance measuring unit and/or the second optical distance measuring unit are/is calibratable on the basis of a first distance to the retroreflector as measured by the first optical distance measuring unit and a second distance to the retroreflector as measured by the second optical distance measuring unit.

In one embodiment of the laser tracker according to the invention, the beam directing unit comprises a position-sensitive detector, in particular a tracking area sensor, for detecting the first measurement radiation or second measurement radiation reflected by a target, such that depending on a position of the reflected first or second measurement radiation on the detector the alignment of the measurement radiation is readjustable for a continuous target tracking, in particular wherein the beam directing unit additionally comprises a localization camera for the coarse localization of the measuring aid and/or an overview camera for providing images for a user; the first optical distance measuring unit comprises an interferometer and/or an absolute distance measuring device; the beam directing unit comprises deflection means, in particular beam splitters, for generating a common beam path of the first measurement radiation and the second measurement radiation in the beam directing unit, such that the first measurement radiation and the second measurement radiation are emittable through the same laser emission and reception optical unit; and/or the laser emission and reception optical unit is designed as a laser emission optical unit and a laser reception optical unit separate from the latter.

The invention additionally relates to a method for using a second distance measuring device designed as a WFD module in a laser tracker and a method for using a second distance measuring device designed as an FMCW module in a laser tracker.

A method for using a WFD module in a laser tracker for providing additional measurement functionality, wherein the laser tracker comprises a beam directing unit having a laser emission and reception optical unit for emitting measurement radiation and for receiving measurement radiation reflections, and an optical distance measuring apparatus having at least one first distance measuring device for measuring the distance to a measuring aid by means of a first measurement radiation, comprises according to the invention:

generating a pulsed light beam, in particular laser beam, as second measurement radiation by means of a beam source of the WFD module, emitting the second measurement radiation onto a target to be measured, wherein one part of the second measurement radiation is forwarded as reference beam to the detector, and another part of the second measurement radiation is emitted through the laser emission and reception optical unit, a measurement radiation reflection of the second measurement radiation that is reflected from the target and received through the laser emission and reception optical unit is forwarded to the detector, the detector detects pulses of the forwarded reference beam and of the reflected forwarded measurement radiation reflection, the detected pulses are digitized in the context of a waveform digitizing process of the WFD module, and a distance to the target is ascertained on the basis of the digitized pulses.

A method for using an FMCW module in a laser tracker for providing additional measurement functionality, wherein the laser tracker comprises a beam directing unit having a laser emission and reception optical unit for emitting measurement radiation and for receiving measurement radiation reflections, and an optical distance measuring apparatus having at least one first distance measuring device for measuring the distance to a measuring aid by means of a first measurement radiation, comprises according to the invention:

generating a frequency-modulated laser beam having a continuously variable frequency as second measurement radiation by means of a beam source of the FMCW module, emitting the second measurement radiation onto a target to be measured, wherein one part of the second measurement radiation is split off as reference beam, and another part of the second measurement radiation is emitted through the laser emission and reception optical unit a portion of the second measurement radiation that is reflected from the target and received through the laser emission and reception optical unit is forwarded to a detector of the FMCW module, and on the basis of a frequency evaluation of the reference beam and the reflected portion of the second measurement radiation, a distance to the target is ascertained, in particular on the basis of the principle of the evaluation of a phase difference between the frequency modulation of the reference signal and the frequency modulation of the reflected measurement radiation signal.

In one embodiment of a method according to the invention, the target to be measured is a diffusely scattering surface of a measurement object, wherein
the second measurement radiation is emitted onto the diffusely scattering surface,
a portion of the second measurement radiation is reflected from the surface, and
the distance to the surface is ascertained.

In one particular embodiment of this method, a multiplicity of distance measurements with respect to a multiplicity of measurement points on the surface are carried out by means of the second measurement radiation, wherein for the multiplicity of the distance measurements a present alignment of the beam directing unit is linked with the respectively measured distance, such that a point position is in each case defined by the linking, and a point cloud comprising a number of the point positions is generated.

In a further embodiment of a method according to the invention, the target to be measured is a retroreflector, in particular as part of a measuring aid, wherein the second measurement radiation is emitted onto the retroreflector, the second measurement radiation is reflected as measurement radiation reflection from the retroreflector, and the distance to the retroreflector is ascertained.

In one particular embodiment of this method, the first measurement radiation and the second measurement radiation are emitted onto the retroreflector, wherein a distance measured by means of the first measurement radiation and a distance measured by means of the second measurement radiation are used for calibrating the first optical distance measuring device and/or the WFD module or the FMCW module, in particular wherein the first measurement radiation and the second measurement radiation are emitted simultaneously.

The invention furthermore relates to a computer program product for carrying out method steps of a method according to the invention.

A computer program product having program code, stored on a machine-readable carrier, is designed according to the invention for controlling or carrying out at least the following steps of the method according to the invention for using a WFD module, particularly if the program is executed on an electronic data processing unit designed as a control and processing unit of a laser tracker in accordance with the first aspect of the invention:
digitizing the detected pulses and
ascertaining the distance to the target.

A computer program product having program code, stored on a machine-readable carrier, is designed according to the invention for controlling or carrying out at least the following steps of the method according to the invention for using an FMCW module, particularly if the program is executed on an electronic data processing unit designed as a control and processing unit of a laser tracker in accordance with the second aspect of the invention:
emitting the second measurement radiation, and
ascertaining the distance to the target on the basis of a frequency evaluation of the reference beam and of the reflected portion of the second measurement radiation.

BRIEF DESCRIPTION OF THE DRAWINGS

The laser tracker according to the invention and the method according to the invention are described in greater detail purely by way of example below on the basis of specific exemplary embodiments that are illustrated schematically in the drawings, further advantages of the invention also being discussed. In the figures, specifically:

FIGS. 7*a-b* show two embodiments of a beam receiving unit of the WFD module;

FIG. 8 shows components of one embodiment of a beam receiving unit comprising a paraboloidal mirror in a three-dimensional view;

DETAILED DESCRIPTION

Figure 1:
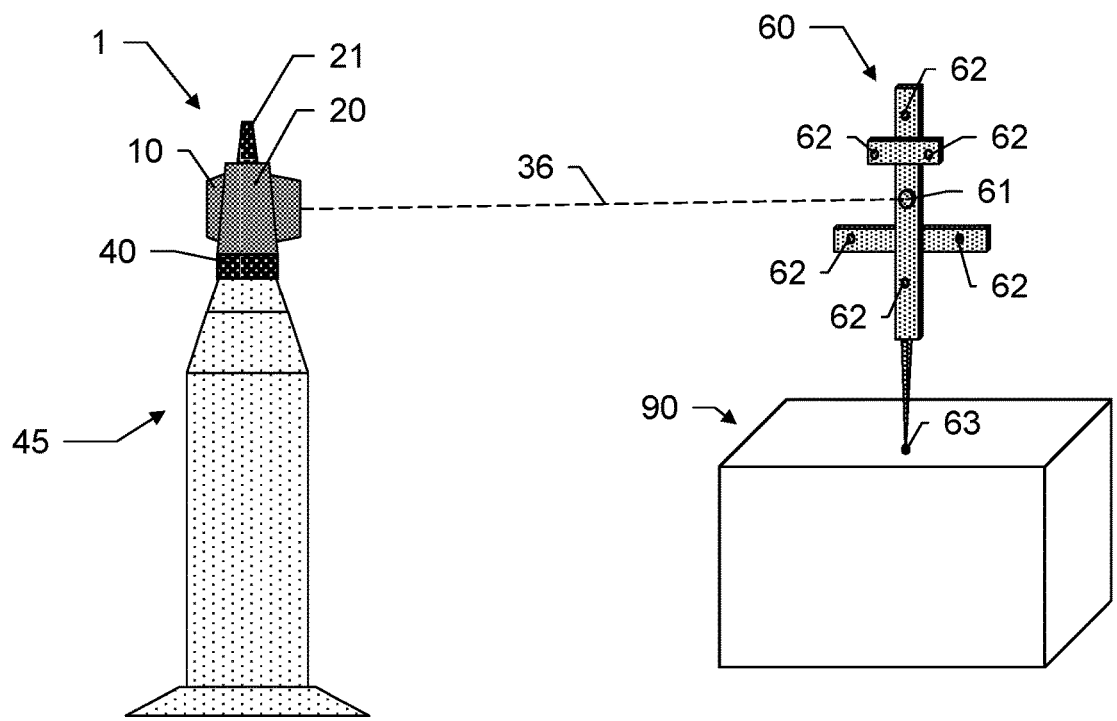
FIG. 1 shows a laser tracker according to the invention when measuring a distance to a measuring aid.

FIG. 1 shows one exemplary embodiment of a coordinate measuring machine according to the invention, designed as a laser tracker 1. The laser tracker 1 shown comprises a base 40, a support 20 fitted thereon and having a handle 21, and a beam directing unit 10 mounted on two struts of the support 20. The laser tracker 1 is arranged on a stand 45, comprises at least one first distance measuring device—in particular an absolute distance measuring device (ADM) or an interferometer—(not illustrated here) and, by means of a laser beam 36, measures the distance to a retroreflector 61 situated on a measuring aid 60. The measuring aid 60—embodied here by way of example as a measuring probe—furthermore comprises a number of target markings 62, for example in the form of reflective or self-luminous light points, and also a measuring head 63 for positioning on a target point to be measured of a target object 90.

The laser tracker 1 optionally comprises a measuring camera, which can be designed in particular as a focusable camera system having variable magnification in order to detect the target markings 62 arranged on the measuring aid 60. The spatial alignment of the measuring aid 60 is determinable on the basis of the positions of the target markings 62 that are recorded by the measuring camera.

A method—usable with such a measuring camera—for continuously determining the spatial position of a measuring aid 60 having a plurality of target markings 62 in a fixed, known spatial distribution relative to one another is described in EP 2 557 391 A1: said method involves continuously detecting camera images of the target markings 62 by means of a measuring camera having an area sensor comprising a multiplicity of pixels, and continuously carrying out reading passes in which the pixels are read with regard to a respective present exposure value. Furthermore, the method involves determining image positions of the imaged target markings 62 in the respective present camera image, and deriving the respective present spatial position of the measuring aid 60 on the basis thereof. In this case, respective present regions of interest are continuously set on the area sensor depending on a collection of image positions determined in at least one previously detected camera image. The present image positions are then determined exclusively taking account of only those present exposure values which are obtained from pixels of the area sensor lying within the presently set regions of interest.

In order to identify and to be able to reproduce movements of the measuring aid 60, such that the laser beam 36 remains aligned with the retroreflector 61, the laser tracker 1 comprises a position-sensitive detector (PSD), in particular a tracking area sensor, such as is described for example in WO 2007/079600 A1.

The PSD is preferably arranged in the beam directing unit 10 and makes it possible to readjust the alignment of the laser beam 30 by detecting the alignment of the laser beam reflected from a target, in particular the retroreflector 61. The readjustment of the laser beam alignment makes it possible for continuous target tracking of the target point to be carried out and for the distance and position of the target point to be determined continuously relative to the measuring machine.

According to the invention, the laser tracker additionally has a distance measuring functionality that makes it possible to measure a distance to a surface 92 of the measurement object 90. This is shown in FIG. 2.

Figure 2:
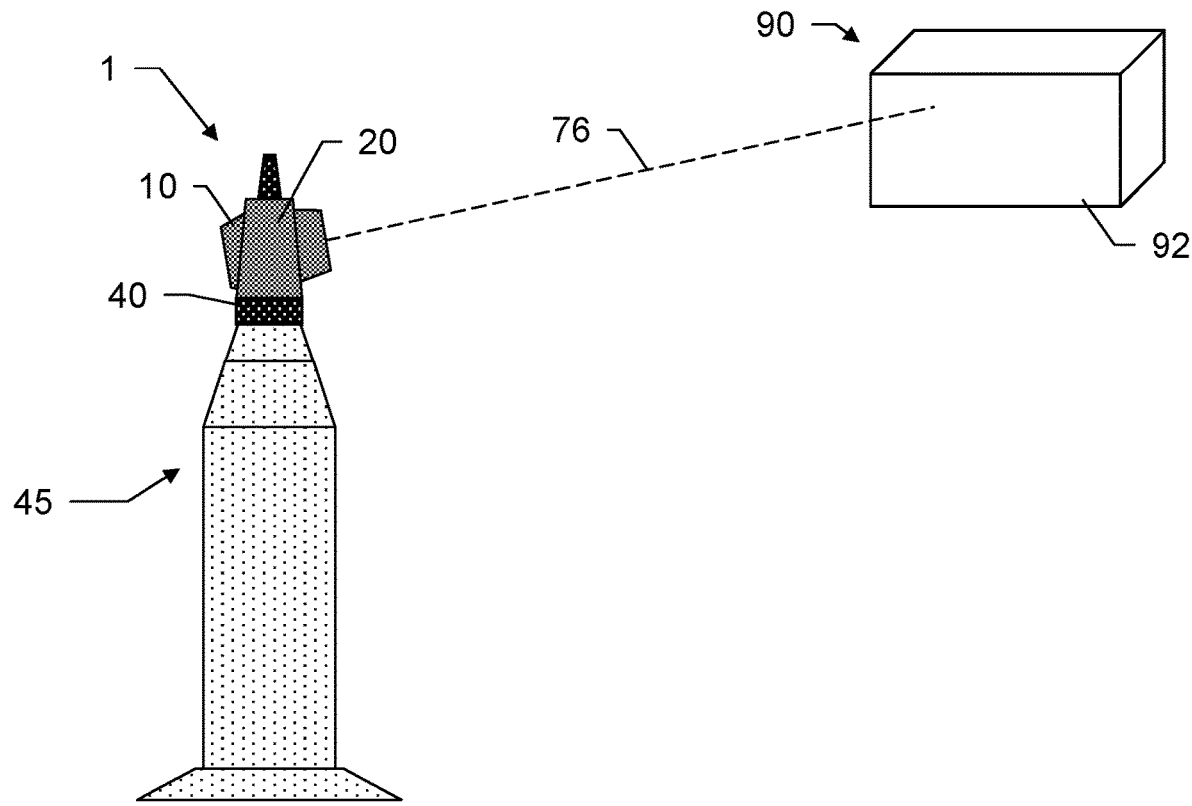
FIG. 2 shows a laser tracker according to the invention when measuring the distance to a measurement object by means of a WFD module.

FIG. 2 shows the laser tracker from FIG. 1 when measuring a distance to the measurement object 90 by means of a WFD measurement beam 76. The distance is measured by means of a waveform digitizing module (WFD module; not illustrated here) provided according to the invention in the beam directing unit 10. This method allows distance measurements without using a measuring aid 60 or a retroreflector.

Figure 3:
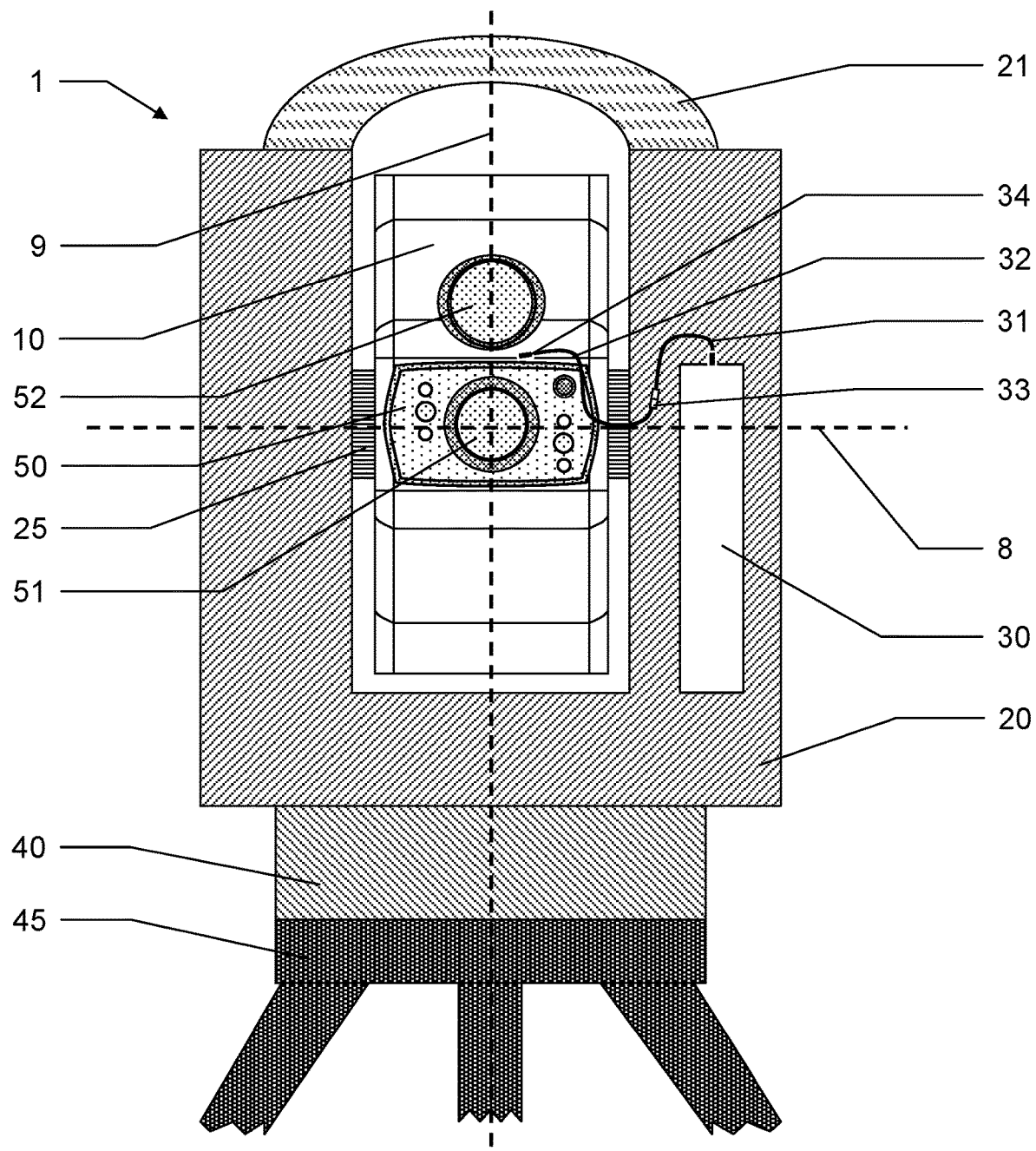
FIG. 3 shows a laser tracker according to the invention in a frontal view.

FIG. 3 shows one exemplary embodiment of a laser tracker 1 according to the invention in a frontal view. The laser tracker 1 comprises a base 40, which is fixable on a holding apparatus, here illustrated in the form of a stand 45. A support 20 is fitted on the base 40 in a manner mounted rotatably about the vertical axis 9. The support 20 comprises a first and a second strut, which project upward from a lower part of the support 20 and on which a beam directing unit 10 is mounted tiltably about the horizontal axis 8 by means of a shaft 25. A handle 21 for the transport and handling of the laser tracker 1 by a user is fitted to the two struts at the top.

Both the mounting of the support 20 on the base 40 and the mounting of the beam directing unit 10 on the support 20 are preferably embodied as a fixed-movable bearing. Axial errors owing to temperature influences and the resultant losses of accuracy are thus minimized. In addition, a temperature-governed expansion of the shaft 25 is noncritical and does not influence a strain of the bearing. As a result, the strain of the bearings remains constant over the entire temperature range of use.

The handle 21 can in particular be fixedly connected to the two struts, for example produced from a molding therewith or welded, adhesively bonded or screwed thereto, such that it serves as an additionally stabilizing element for the struts, in particular with regard to bending. The handle 21 can advantageously be shaped in such a way that it allows an exactly upwardly directed measurement, i.e. along the vertical axis 9, by means of the laser beam. Alternatively, the handle 21 can also have an opening for passage of the laser beam at the corresponding location.

A plurality of optical units are provided on the beam directing unit 10, including an optical unit 52 of a measuring camera and also a lens 50 for the target tracking functionality with a laser emission and reception optical unit 51 of an optical distance measuring apparatus. Furthermore, the beam directing unit 10 preferably comprises an optical unit of a localization camera for coarsely localizing the measuring aid and an optical unit of an overview camera for providing images for a user.

A laser module 30, preferably a helium-neon laser module (HeNe laser module), is integrated into the support 20, or into one of the struts. Particularly advantageous embodiments of a usable laser module 30 are also disclosed in CH 706 633 A2.

An optical waveguide system comprising a first fiber 31 and a second fiber 32 leads from said laser module 30 through the shaft 25 into the beam directing unit 10 as far as a collimator 34 of a distance measuring apparatus (not illustrated here), in particular of an interferometer. In this case, the first fiber 31 of the optical waveguide system, said first fiber running in the support 20, is connected without torsion to the second fiber 32 of the optical waveguide system, said second fiber running in the beam directing unit 10, via a plug connection 33 preferably provided in the support 20. Arranging the plug connection in proximity to the laser module 30 in the support 20 has the advantage that the laser module 30 together with the first fiber 31 is exchangeable more easily. Preferably, the optical waveguide system is polarization-maintaining, and/or the first and second fibers 31 and 32 are single-mode fibers.

Figure 4:
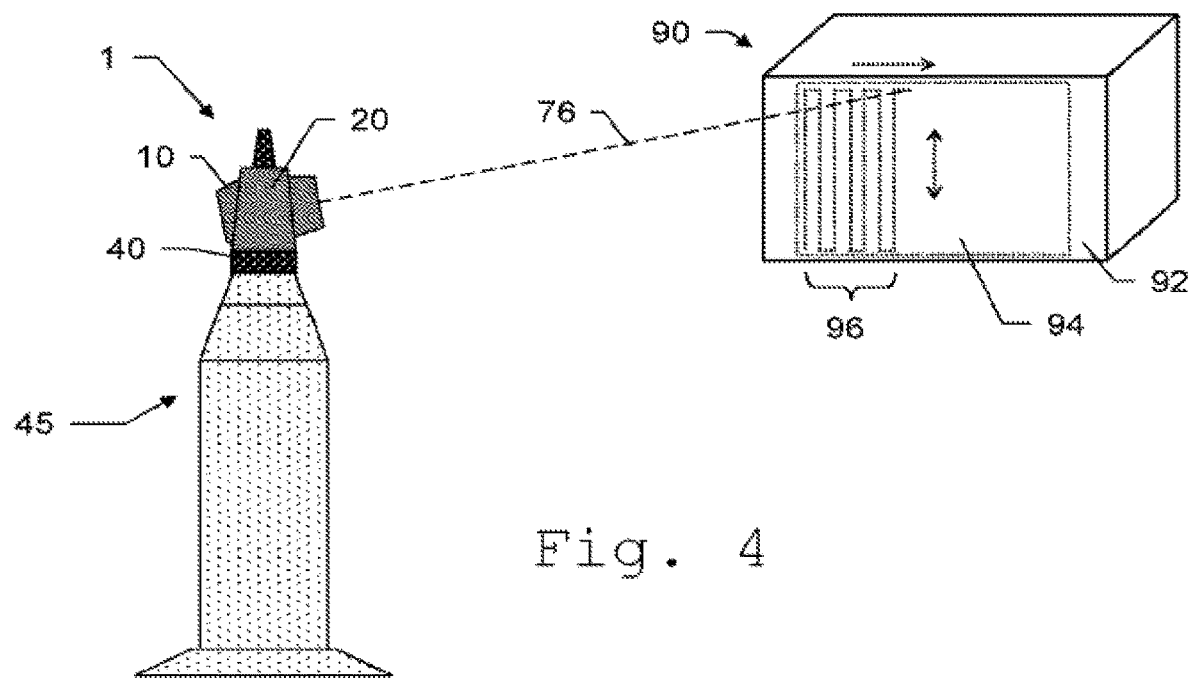
FIG. 4 shows one embodiment of the laser tracker according to the invention when scanning a measurement object in the context of a scanning functionality of the WFD module.

FIG. 4 shows one embodiment of the laser tracker 1 according to the invention in which a scanning functionality is implementable by means of the WFD module. In this case, on a scanning area 94 of a surface 92 of the measurement object 90, a multiplicity of measurement points are successively targeted by the beam directing unit 10, in each case a distance being ascertained and linked with angle data, such that a position can be ascertained for each of the measurement points. Targeting the points can be carried out, as illustrated here, by traversing the scanning area 94 in a regular pattern 96, e.g. in parallel paths at a defined distance from one another. The ascertained positions of the measurement points can then be joined together to form a point cloud.

Figure 5:
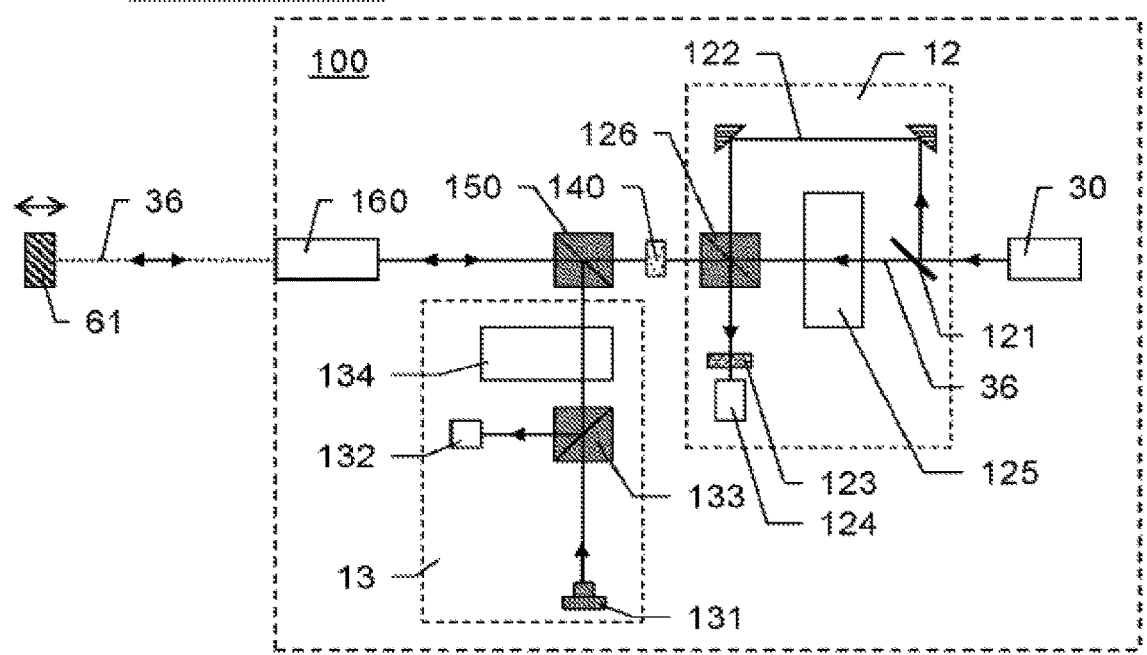
FIG. 5 shows an optical construction of a laser tracker from the prior art.

FIG. 5 shows one exemplary optical construction 100 of a laser tracker according to the prior art, as described for example in EP 2 634 594 A1. It has a functionality for checking measurements of distance changes that are carried out with an interferometer 12. Moreover, the construction 100 comprises a beam source 30, e.g. an HeNe laser beam source or a laser diode, and an absolute distance measuring device 13 (ADM) having a further beam source 131, e.g. a laser diode or an SLED (Superluminescent LED).

The light beam emerging from the beam source 131 of the ADM is guided onto a polarizing beam splitter 133 and from there through an electro-optical modulator 134 to a wavelength-dependent beam splitter 150. Such a beam splitter with wavelength-dependent beam splitting is used in particular in the case of different emission wavelengths of the two light sources 30, 131. The returning light is guided in the ADM 13 through the polarizing beam splitter 133 onto an ADM detector 132. In particular, in this context it is also possible to use other ADM arrangements and methods in which the measurement light beam can be coupled in and out through the wavelength-dependent beam splitter 150, for example. Examples of such a distance measuring device are described in WO 03/062744 A1 and WO 2009/103172 A1. In principle, other types of ADM, such as e.g. phase measuring devices or distance measuring devices operating according to the Fizeau principle, can also be used here and in the other embodiments of the invention.

The interferometer 12 uses light that is generated by the beam source 30. In the embodiment shown, said source 30 is assigned directly to the construction 100, wherein said source generates for example a longitudinally monomode laser radiation with a long coherence length (single frequency). In an alternative embodiment, the beam source can be assigned to a different component of the measuring instrument, wherein the radiation is coupled into the interferometer 12 by means of an optical waveguide. The laser radiation generated is split into a reference radiation 122 on a reference light path and a measurement radiation 36 on a measurement light path by a beam splitter 121. The measurement light path leads through an acousto-optical modulator 125 and impinges together with the reference light path on a polarizing beam splitter 126. The polarizing beam splitter 126 guides the measurement radiation 36 further to the wavelength-dependent beam splitter 150, and directs the returning measurement light together with the reference light via a polarization filter 123 to an interferometer detector 124. The method of operation of such an interferometer 12 is fundamentally known and is based on the wave interference principle. In particular, it is also possible to use other interferometer arrangements and methods in which the measurement radiation can be coupled in and out through the wavelength-dependent beam splitter 150, for example. One example of such an interferometer is described in WO 03/062744 A1. In principle, other types of interferometers (e.g. Michelson with quadrature detection) can also be used.

A superimposition of the reference radiation 122 with the measurement radiation 36 reflected at a movable target 61 and guided onto the interferometer detector 124 is detected at the interferometer detector 124. The intensity of the interference arising upon the superimposition of the two radiations 36, 122 can be detected continuously (as interferometer output variable) in this case. The derivation of the interferometer output variable is based here at least on the detected superimposition, wherein the interferometer output variable is dependent on a distance to the target.

If the target 61 is situated at a constant distance from the optical construction 100 or from the interferometer detector 124, then the intensity value measured during the maintained fixed distance to the target 61 is constant. With a relative movement—in relation to an optical axis defined by the measurement radiation 36—of the target 61 with respect to the optical construction 100 (or with a movement of the construction), there is a change in the distance between the two components 100, 61, thus a path difference between the reference radiation 122 and the measurement radiation 36 and, as a result, the intensity measurable at the interferometer detector 124 depending on the distance change. By means of the interferometer detector 124, these intensity variations can be measured and detected (as an output variable profile), in particular in a temporally resolved manner, and can be read and processed further for checking the correctness of such a distance change measurement. The temporally resolved output variable profile is generated from the derived interferometer output variable, the distance change being ascertained on the basis of the output variable profile.

In order to check the correctness of such a measurement, a movement parameter is continuously derived from the intensities detected by the interferometer detector 124 and this parameter is continuously compared with a movement criterion. Depending on the comparison, information regarding the reliability of the measurement carried out is then output.

The optical construction 100 furthermore comprises a $\lambda/4$ plate 140 and a component 160, which separate light that is incident in the construction 100 from outside along a common optical axis used by the absolute distance measuring device 13 and the interferometer 12, and coupled-out a first part of said light to an overview camera (not illustrated) and a second part to a position transducer (not illustrated). The overview camera can have a dedicated optical unit and in addition an image converter. In this case, the overview camera typically has an aperture angle of around 10° and a focal length of 30-50 mm, for example, and serves for the coarse localization of measurement targets.

For detecting reflective targets, the construction 100 can additionally preferably have a reflector illumination with a specific illumination wavelength which illuminates an angular range that is preferably at least equal to the aperture angle of the overview camera.

An evaluation electronic unit and/or evaluation software of the overview camera then detect(s) for example one or more bright light points in the field of view of the overview camera, which in each case correspond to a reflective target. It is possible to ascertain therefrom their position in the image of the overview camera and therefrom in turn a change in the alignment of the target, e.g. of an auxiliary measuring instrument (e.g. contact sensing unit or scanner), whereby the measuring instrument or the optical construction 100 and the light beams of the distance measuring device or devices 12, 13 can be aligned with the target. Thus, an automatic target detection and a "lock-on", i.e. a continuous tracking of the target, of the distance measuring devices 12, 13 onto a target can therefore be realized.

The light portion for the position transducer is typically a beam of returning light that was emitted by one of the distance measuring devices 12, 13, preferably by the interferometer arrangement 12. The position transducer can have a dedicated optical unit and, for example, a position-sensitive detector (tracking area sensor, in particular PSD or CCD), wherein measurement laser radiation reflected at the target can be detected thereon.

In this context, PSD should be understood to mean an area sensor which operates locally in an analog manner and can be used to determine a centroid of a light distribution on the sensor area. In this case, the output signal of the sensor is generated by means of one or a plurality of photosensitive areas and depends on the respective position of the light centroid. By means of a downstream or integrated electronic unit, the output signal can be evaluated and the centroid can be ascertained. In this case, the position of the centroid of the impinging light point can be ascertained very rapidly (nanoseconds range) and with a sub-nanometer resolution.

By means of said PSD, it is possible to determine an offset of the impingement point of the detected beam from a servo control zero point and to carry out a tracking of the laser beam to the target on the basis of the offset. For this purpose and in order to achieve a high accuracy, the field of view of said PSD is chosen to be comparatively small, i.e. corresponding to the beam diameter of the measurement laser beam. Detection using the PSD is carried out coaxially with respect to the measurement axis, such that the detection direction of the PSD corresponds to the measurement direction. The use of PSD-based tracking and fine targeting can take place only after the measuring laser has been aligned with a retroreflective target (at least coarsely, i.e. in such a way that the target lies within the measurement laser cone).

Figure 6A:
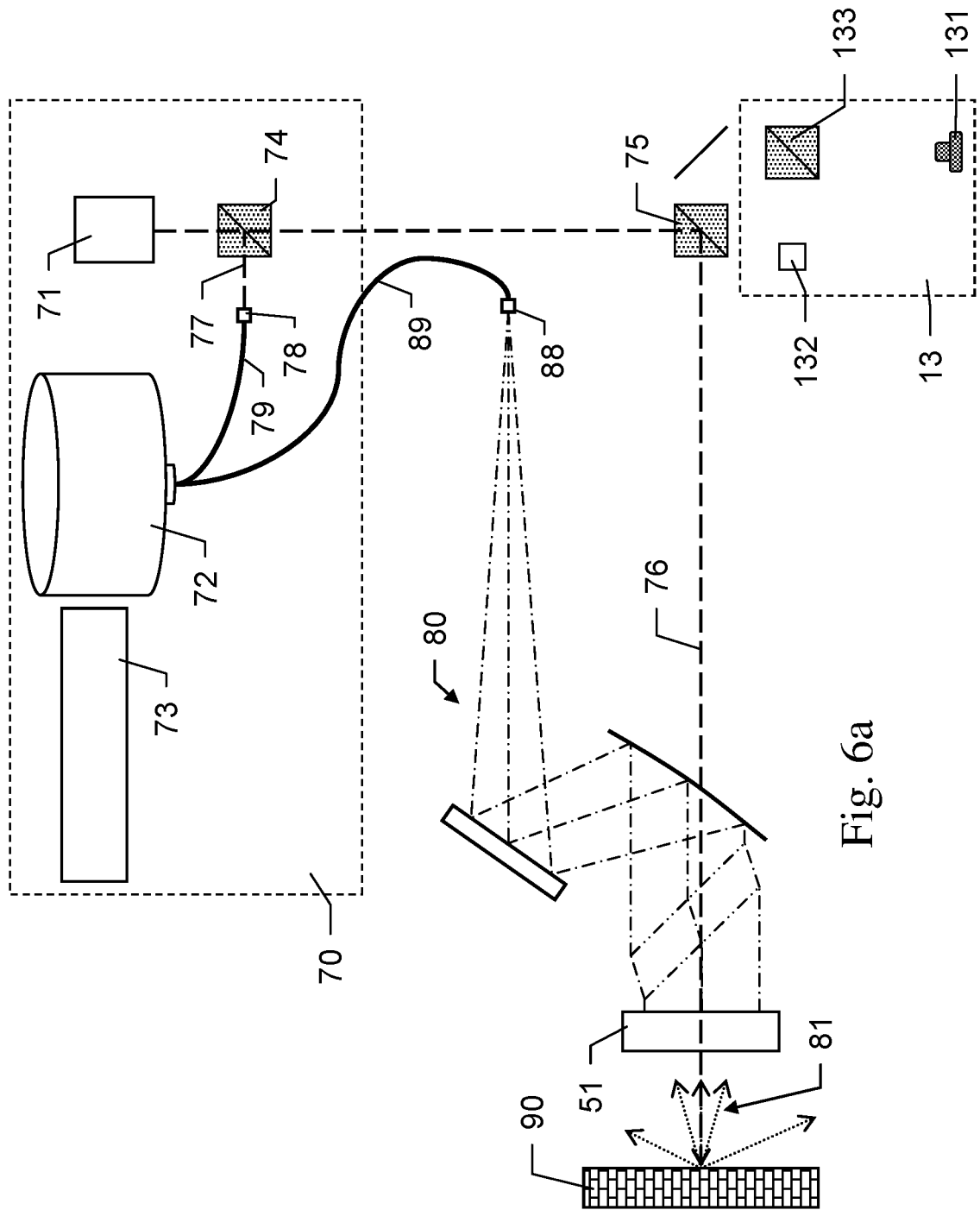
FIGS. 6*a-b* show a first embodiment of an optical construction of a laser tracker according to the invention comprising a WFD module.
Figure 6B:
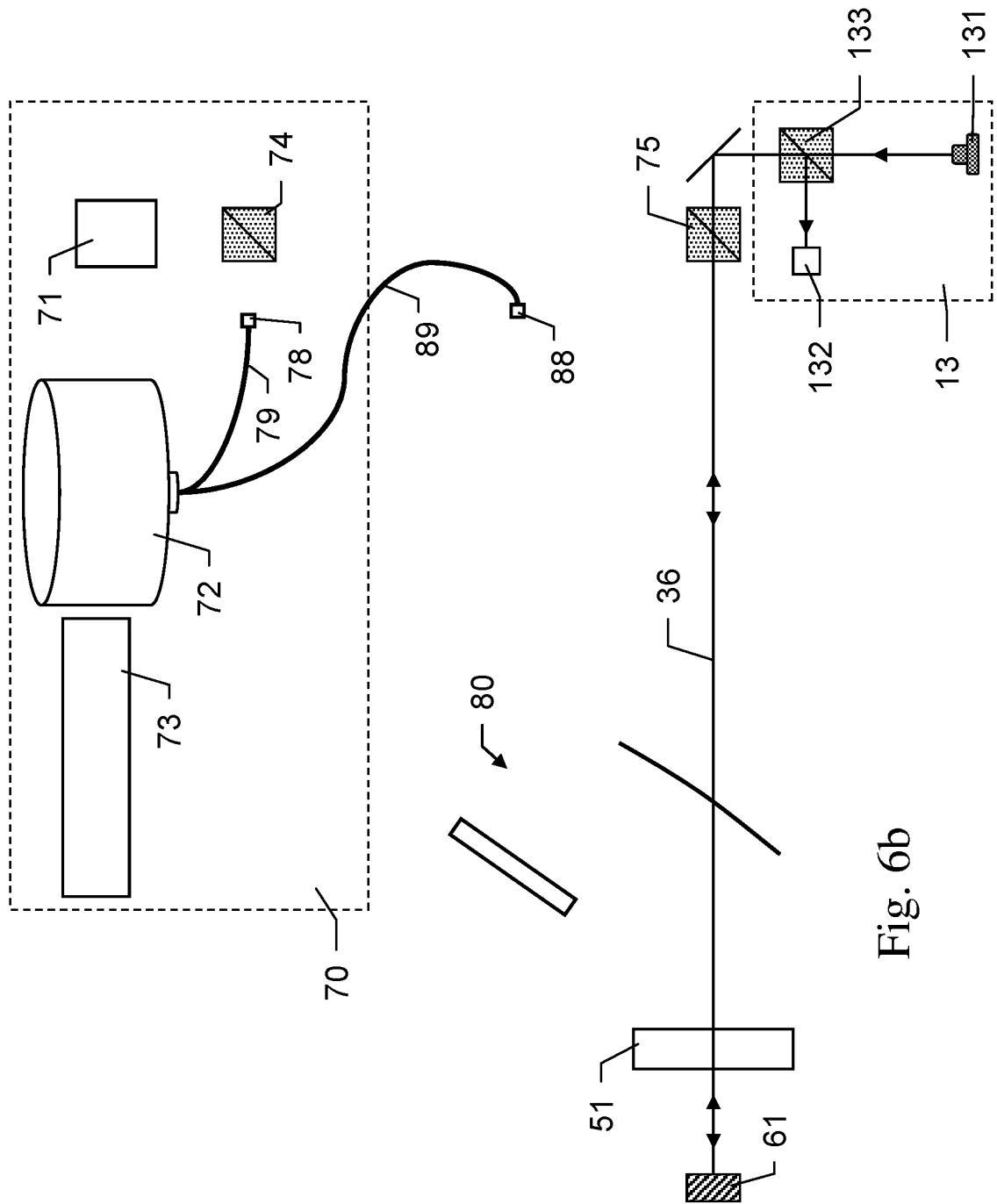

One exemplary optical construction of a laser tracker according to the invention comprising an absolute distance measuring device 13 (ADM) and a waveform digitizing module (WFD module 70) according to the invention is shown in FIGS. 6a and 6b. In this case, FIG. 6a shows a distance measurement to a measurement object 90 by means of the WFD module 70 according to the invention, and FIG. 6b shows a distance measurement to a retroreflector 61 by means of an ADM 13 such as was described in FIG. 5.

The WFD module 70 is installed together with the ADM 13 in the beam directing unit of the laser tracker and uses the same laser emission and reception optical unit 51 as the ADM 13. The WFD module 70 comprises a beam source 71 for generating a pulsed light beam, in particular laser beam, (WFD beam 76). The WFD beam 76 having measurement pulses is firstly guided onto a first beam splitter 74, whereby a reference beam 77 having the same measurement pulses as the WFD beam 76 is split off and is guided onto a reference beam coupling-in element 78, which couples the reference beam 77 into a first optical waveguide 79, which leads to the detector 72 of the WFD module 70.

The other part of the WFD beam 76 is coupled into the common beam path with the measurement radiation of the ADM 13 by means of a second beam splitter 75 and is directed through the laser emission and reception optical unit 51 onto the measurement object 90 to be measured. A portion 81 of the WFD beam 76 that is reflected from the diffusely scattering surface of the measurement object 90 passes through the laser emission and reception optical unit 51 again into the beam directing unit. The reflected radiation has target pulses which correspond to the measurement pulses but are temporally offset—in accordance with the distance to the target. In the beam directing unit, the reflected radiation 81 is concentrated by a beam receiving unit 80 and directed onto a coupling-in unit 88, which couples the reflected radiation 81 into a second optical waveguide 89, which leads to the detector 72 of the WFD module 70. The latter detects the reflected portion 81 of the WFD beam 76 and the reference beam 77. The pulses of the reflected radiation 81 and of the reference beam 77 are digitized in a known manner referred to as waveform digitizing. The measurement pulses and target pulses digitized in this way are compared with one another, in particular the temporal separation between them, and the distance to the measurement object 90 is thus ascertained by a computing unit 73.

The WFD beam 76 has at least one sampling light pulse (WFD pulse) which is modulated such that its portion returning from the target object is provided for being evaluated according to the waveform digitizing method (WFD method)—with temporal sampling of the returning pulse—(that is to say can be sampled and evaluated according to the WFD method), and at least one phase comparison light signal train which is modulated such that its portion returning from the target object is provided for being evaluated according to the phase comparison method.

Detection can then involve carrying out a signal sampling for identifying and determining a temporal position of the returning portion of the sampling light pulse, and—in par- allel therewith—evaluation of the detected returning portion of the phase comparison light signal train according to the phase comparison method.

Waveform digitizing (WFD) is based on the combination of two basic principles for signal detection that are customary in distance measurement. The first basic principle is based on measurement signal detection on the basis of the threshold value method, and the second basic principle is based on signal sampling with downstream signal processing for identifying and determining the temporal position of the signal. The propagation time and thus the distance between a measurement pulse emitted by the emission unit 71 and a target pulse (measurement pulse reflected from the target object 90 and detected by the detector 72) follow for example from the temporal separation of the peak points of the two pulses, the pulses being sampled in a manner similar to that in the case of phase measuring devices.

Advantageously, it is also possible to ascertain distances to more remote targets than with the distance measuring devices shown in FIG. 5.

FIG. 6b shows a distance measurement to a retroreflector 61 (e.g. as part of a measuring aid) by means of the ADM 13 of the coordinate measuring machine according to the invention. One exemplary manner of functioning of such an ADM 13 has already been described with reference to FIG. 5.

In the embodiment shown here, the measurement radiation 36 emerging from the beam source 131 of the ADM 13 is guided onto a polarizing beam splitter 133 and from there via a second beam splitter 75 into the common beam path with the WFD beam and is thus directed through the laser emission and reception optical unit 51 onto the retroreflector 61. The light returning on the same path is guided in the ADM 13 by the polarizing beam splitter 133 onto an ADM detector 132. In principle, it is also possible to use other types of ADM, such as e.g. phase measuring devices or distance measuring devices operating according to the Fizeau principle.

FIGS. 7a, 7b and 8 illustrate the beam receiving unit 80 in more detail. FIG. 7a shows a first embodiment of the beam receiving unit 80. In this case, the reflected portion 81 of the WFD radiation that passed through the laser emission and reception optical unit into the beam directing unit is directed onto a parabolically shaped mirror 85, from which the reflected radiation 81 is reflected in a manner concentrated at an angle of approximately 70° (in particular between approximately 65° and approximately 75°) and is guided as concentrated light 82 via a plane mirror 86 onto a coupling-in unit 88 situated at the focal point, where the concentrated light 82 is coupled into the second optical waveguide 89, such that the light can be guided to the distance measuring device of the WFD module.

The second embodiment of the beam receiving unit 80 as shown in FIG. 7b comprises a beam splitting apparatus 83, by means of which the reflected radiation 81 is guided out of the beam path of the measurement radiation, such that the parabolic mirror 85 itself is not situated in the beam path and can advantageously be totally non-transmissive to the measurement beams.

As a result of the configurations of the beam receiving unit 80 as illustrated in FIGS. 7a-b, said beam receiving unit is positionable in a particularly space-saving manner in the beam directing unit.

FIG. 8 shows one exemplary embodiment of the paraboloidal mirror 85 in a three-dimensional view. The reflected radiation 81 is reflected from the parabolically shaped mirror surface in a concentrated manner in the direction of the planar mirror.

Figure 9:
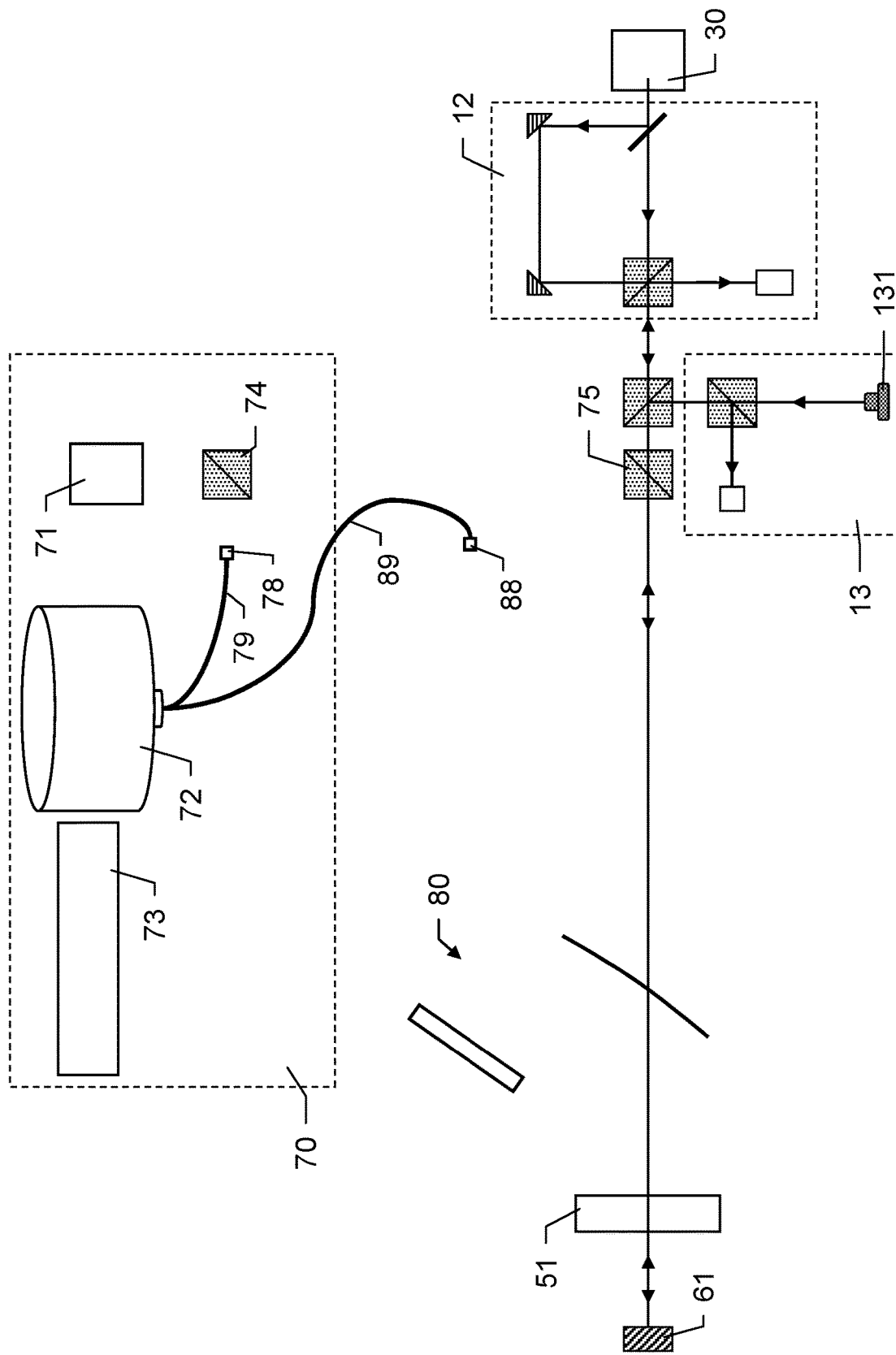
FIG. 9 shows a second embodiment of an optical construction of a laser tracker according to the invention comprising a WFD module.

FIG. 9 shows a second embodiment of an optical construction of a laser tracker according to the invention. In contrast to the construction shown in FIGS. 6a and 6b, the construction illustrated here additionally comprises an interferometer 12 as was described with reference to FIG. 5. The illustration shows simultaneous distance measurement to a retroreflector 61 by means of the ADM 13 and the interferometer 12. The WFD module 70 is not used here, since the other distance measuring devices 12, 13 yield more accurate results in each case. Nevertheless, the WFD module 70 can also be used for measuring a distance to a retroreflector 61. What is advantageous here, in particular, is the possibility of measuring, using the WFD radiation 76, distances over greater ranges than with the ADM 13 or the interferometer 12.

Figure 10:
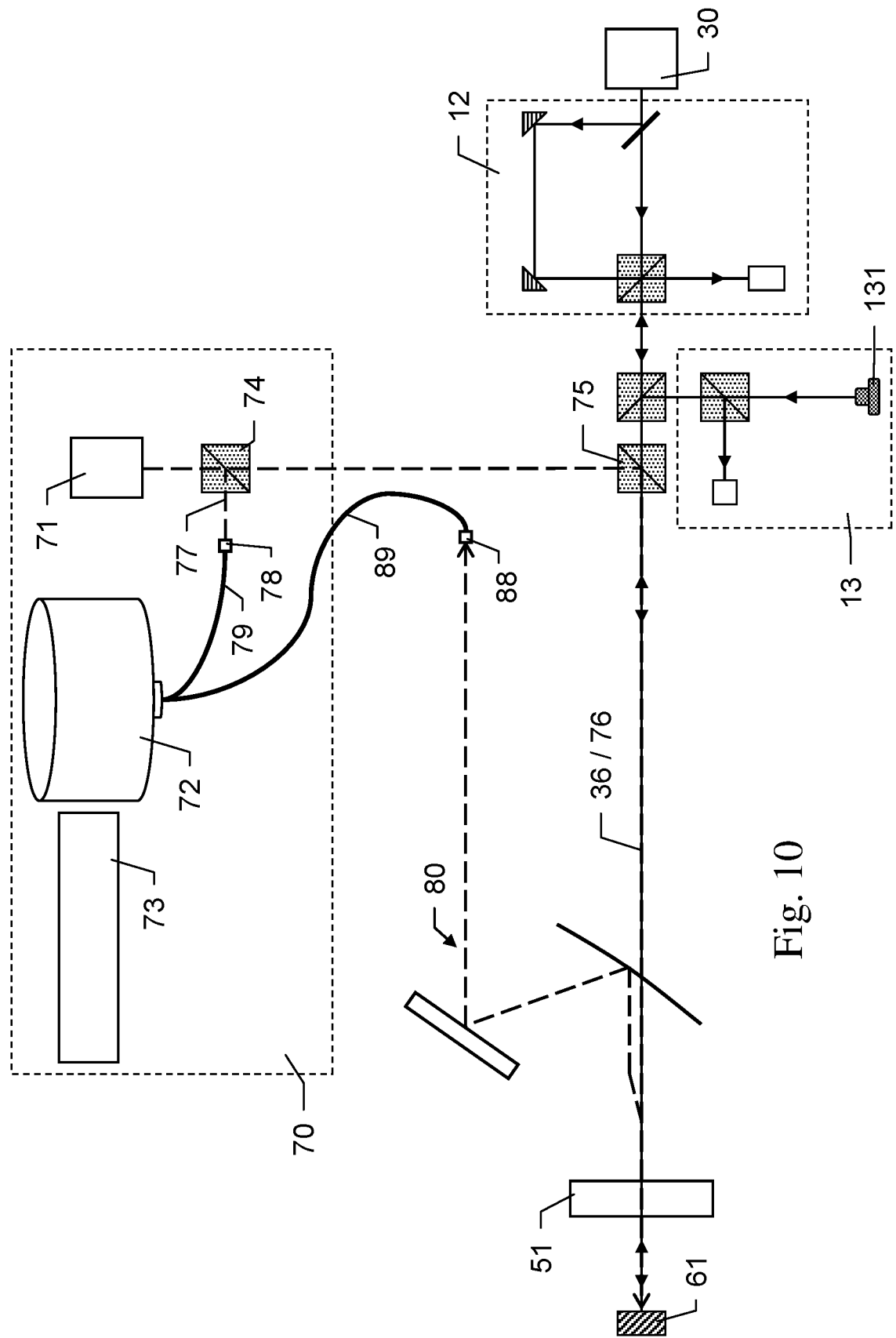
FIG. 10 shows the embodiment from FIG. 9 when simultaneously measuring a distance to a retroreflector with the WFD module and further distance measuring devices.

FIG. 10 illustrates the second embodiment of the optical construction, wherein a distance measurement is carried out simultaneously with the WFD module 70 and the other distance measuring devices (ADM 13, interferometer 12), which can be used for calibrating the components of the WFD module 70 or the other distance measuring devices.

Figure 11:
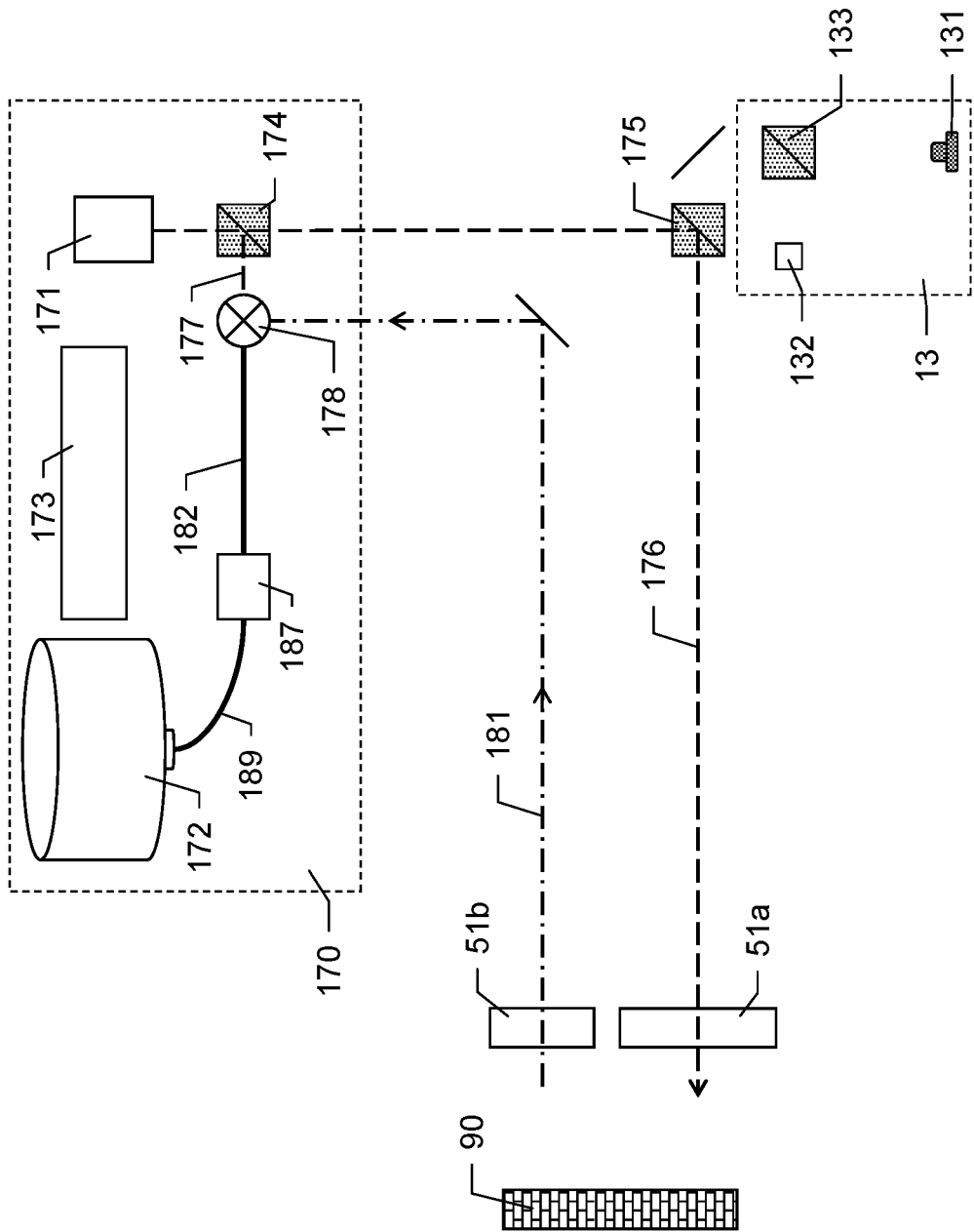
FIG. 11 shows a first embodiment of an optical construction of a laser tracker according to the invention comprising an FMCW module.
Figure 12:
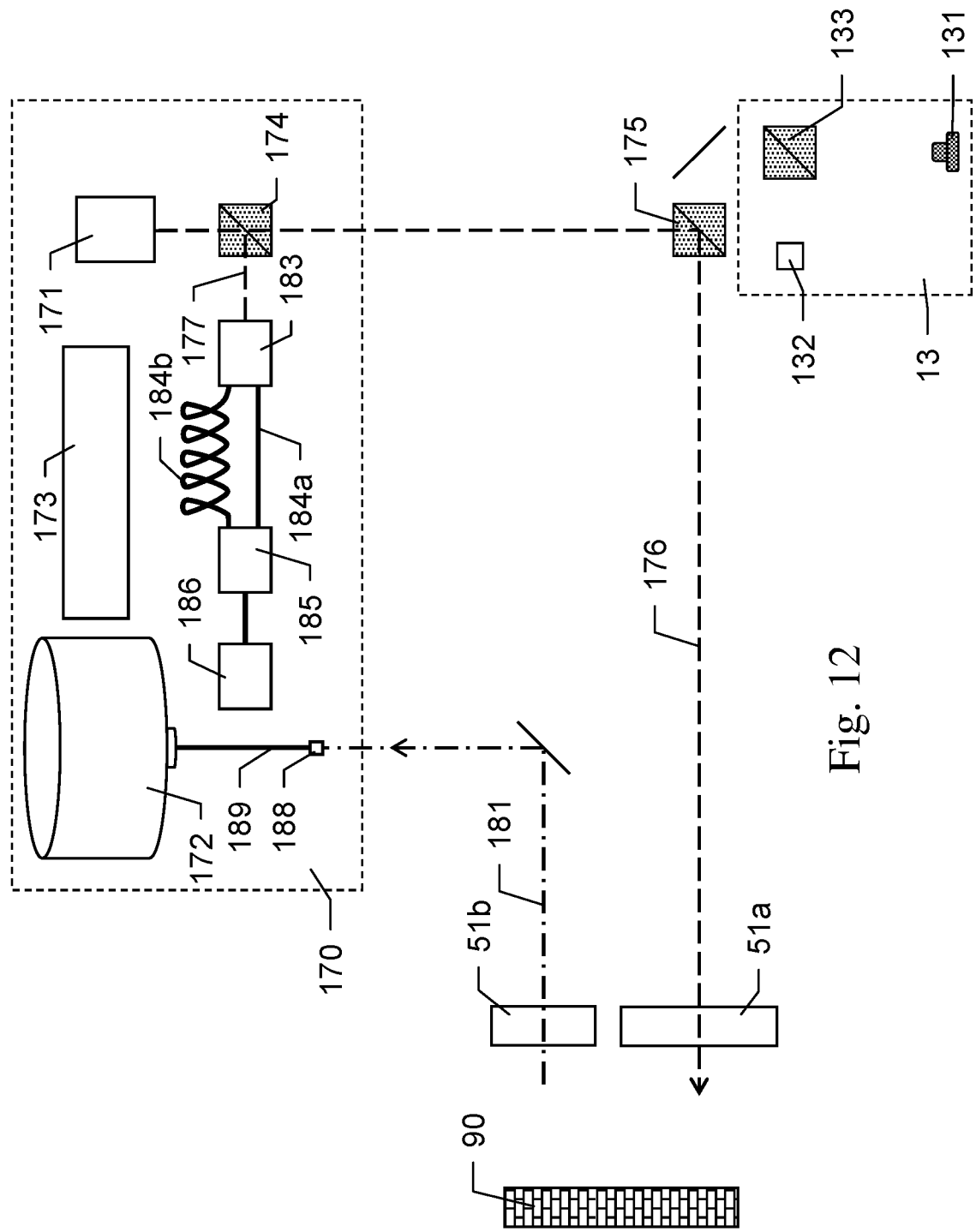
FIG. 12 shows a second embodiment of an optical construction of a laser tracker according to the invention comprising an FMCW module.

FIGS. 11 and 12 show two further embodiments of the optical construction of a laser tracker according to the invention. These comprise, alongside the ADM 13, in each case an FMCW module 170 comprising a second beam source 171 designed for emitting a frequency-modulated laser beam 176, thereby enabling a distance measurement by means of an FMCW method. In particular, the FMCW module can comprise a coherent laser radar, as described e.g. in EP 1 869 397 B1.

The approach—used in this embodiment—for measuring the distance to a diffusely scattering surface of a measurement object 90 consists in emitting frequency-modulated electromagnetic radiation, such as e.g. light, onto the target to be measured, and subsequently in receiving one or more echos from backscattering objects, ideally exclusively from the target to be measured. After reception, the possibly superimposed echo signal is superimposed with a mixing signal and the signal frequency to be analyzed is thereby reduced, with the result that only a lower outlay is necessary in terms of apparatus. In this case, the mixing can be carried out either as a homodyne method with the transmitted signal or as a heterodyne method with a periodic, in particular harmonic, signal having a known period. Consequently, the methods differ in that mixing is carried out with the transmission signal itself or with a harmonic signal with a dedicated frequency. The mixing serves to transform the received signal to lower frequencies. Afterward, the propagation times and thus—given a known speed of propagation of the radiation used—the distances to the targets to be measured are determined from the resulting signal.

The apparatuses used for implementing these methods usually use a signal generator as chirp generator, which impresses a signal on a modulatable radiation source. In the optical field, lasers are usually used as radiation sources. For emission and for reception, in the optical field it is possible to use transmission and reception optical units, downstream of which is disposed a detector or receiver with subsequent mixer, A/D converter and digital signal processor.

A linearly frequency-modulated chip is usually generated as signal s(t) by the signal generator:

$$s(t) = a + b \cdot \cos(2\pi \cdot \Phi(t)), \Phi(t) = c + d \cdot t + e \cdot t^2 \tag{1}$$

wherein the instantaneous frequency $$f(t) = \frac{d\Phi(t)}{dt}$$

is then a linear function of time:

$$f(t) = d + 2e \cdot t \tag{2}$$

which simplifies the determination of the propagation times.

In the case of n targets with relative amplitudes $A_k$ and propagation times $t_k$ (k=1, ..., n), the noise-free echo signal e(t) can be written as follows:

$$e(t) = \sum_{k=1}^{n} A_k s(t - t_k) \tag{3}$$

This echo signal e(t) is detected and mixed with the signal m(t):

$$m(t) = \begin{cases} s(t - t_0), & \text{homodyne} \\ \cos(2\pi(f_0 t + \varphi)), & \text{heterodyne} \end{cases} \tag{4}$$

Mixing with m(t) gives rise to the signal $$d(t) = \int_0^\infty h(t - t') \cdot e(t') \cdot m(t') dt' \tag{5}$$

where h denotes the impulse response of a suitable low-pass filter.

For an ideal low-pass filter, it is possible to explicitly implement the low-pass filtering in (5) in accordance with the prior art to a very good approximation; in the homodyne case, for example, there follows from the first equation (1) and equations (3) to (5) after omission of the high-frequency terms $$d(t) = d_0 + \frac{b^2}{2} \sum_{k=1}^{n} A_k \cos(2\pi[\Phi(t - t_k) - \Phi(t - t_0)]) \tag{5'}$$

with the signal offset $$d_0 = a^2 \sum_{k=1}^{n} A_k.$$

The mixed signal d(t) is digitized on the finite measurement interval $-T/2 \le t \le T/2$ and stored.

From the frequency information and, if appropriate, the phase information of this signal, the propagation times $t_k$ are determined, wherein n can normally be assumed to be small and possibly also to be known. One of the echoes, e.g. the n-th, can also originate from a fixed and known reference target and the target distances of the remaining targets are calculated from the propagation time differences $t_k - t_n$ and the known distance of the reference target. In the homodyne case, the mixing signal $m(t) = s(t - t_0)$ itself can serve as a reference; $t_0$ then corresponds to the reference distance.

In the case of a linear chirp in accordance with equation (1), the k-th echo contributes the instantaneous frequency $$f_k(t) = \begin{cases} 2e(t_0 - t_k), & \text{homodyne} \\ d + 2e(t - t_k) - f_0, & \text{heterodyne} \end{cases} \quad (6)$$

to the signal d(t). Consequently, in this case, the propagation times $t_k$, can be determined directly, in principle, from a frequency analysis—which is temporally resolved in the heterodyne case—of the signal d(t), although the resolution is still coarse. More accurate results can be obtained by taking account of the phase information.

A frequency-modulated method with continuous emission (FMCW method) for distance measurement with electromagnetic radiation in the radar range is known from DE 196 10 970 A1. In that case, a time-linearly frequency-modulated (wobbled) signal is emitted and is analyzed after reflection at a target and subsequent reception. In that method, an intermediate frequency signal is generated from transmission and reception signals in a mixer and is subjected to a fast Fourier transformation.

FIG. 11 shows measurement of a distance to a measurement object 90 having a diffusely scattering surface by means of the FMCW method.

An FMCW module 170 is installed together with the ADM 13 in the beam directing unit of the laser tracker and uses the same laser emission optical unit 51a as the ADM 13. The FMCW module 170 comprises a beam source 171 with drive means for generating a frequency-modulated laser beam 176 having a continuously variable frequency. The frequency-modulated laser beam 176 is firstly guided onto a first beam splitter 174, whereby a reference beam 177 is split off and is guided onto a mixer element 178.

The other part of the frequency-modulated laser beam 176 is coupled into the common beam path with the measurement radiation of the ADM 13 by means of a second beam splitter 175 and is directed through the laser emission optical unit 51a onto the remote measurement object 90 to be measured. Radiation 181 of the frequency-modulated laser beam 176 that is reflected from the diffusely scattering surface of the measurement object 90 passes partly through the laser reception optical unit 51b (embodied here separately from the laser emission optical unit 51a purely by way of example) again to the beam directing unit. In the latter, the reflected radiation 181 is guided onto the mixer element 178, in which the reflected radiation 181 is subjected to homodyne or heterodyne mixing with the reference beam 177. Optionally, the reflected radiation 181 may have been amplified beforehand by means of an RF preamplifier.

The resulting mixed signal 182 is then passed to the detector 172 of the FMCW module 170; in particular, the mixed signal can in this case also be passed via a low-pass filter and a baseband amplifier to the detector 172, which can be designed as an analog/digital converter, in particular. A computing unit 173, in a known manner, can then ascertain a frequency difference, i.e. in particular a separation between the frequencies of the reference beam 177 and the reflected radiation 181, and calculate therefrom the distance to the measurement object 90.

FIG. 12 shows an alternative embodiment of the FMCW module 170. The latter comprises, instead of the mixer element, an optical reference system for the reference beam 177 having two optical fibers 184a, 184b. Such an optical reference system is described in EP 1 869 397 B1, for example. In this case, the first optical fiber 184a has a different length than the second optical fiber 184b. The reference beam 177 is split in a first optical fiber coupler 183, guided as respective parts through the first and second optical fibers 184a, 184b and, having been combined again by means of a second optical fiber coupler 185, is guided onto a reference beam detector 186. On account of the known different lengths of the two optical fibers 184a, 184b, the frequency of the reference beam 177 can be accurately detected by the reference beam detector 186 at any point in time. The reflected portion 181 of the frequency-modulated laser beam 176 is guided via the coupling-in unit 188 and the optical waveguide 189 onto the detector 172 (e.g. analog/digital converter). On the basis of the frequencies of the reflected radiation 181 and of the reference beam 177, or on the basis of the temporal offset thereof, the distance to the target is calculated in the computing unit 183 in a known manner.

In the embodiments of the FMCW module 170 as illustrated in FIGS. 11 and 12, the reception of the reflected radiation 181 in the beam directing unit can optionally also be carried out via a beam receiving unit as illustrated e.g. in FIGS. 7a and 7b. Likewise, the laser emission optical unit 51a and the laser reception optical unit 51b can also be embodied as a common laser emission and reception optical unit.

Figure 13:
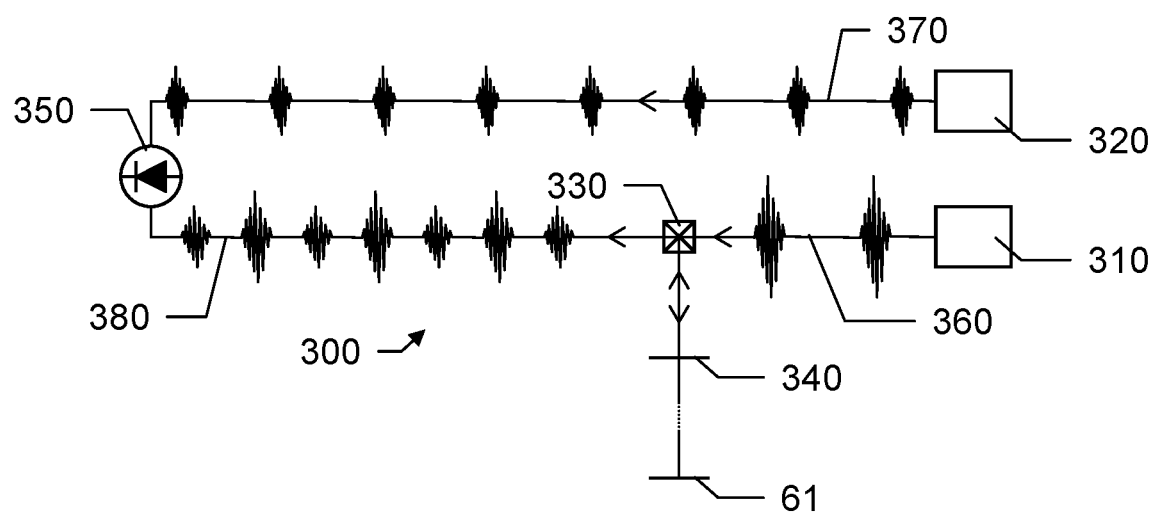
FIG. 13 shows an optical construction of a frequency-comb-based distance measuring unit.

In a further embodiment, illustrated in FIG. 13, at least the first or second distance measuring device comprises means which enable measurement of distances that is based on a frequency comb or is supported by a frequency comb. For this purpose the corresponding distance measuring device comprises a laser source designed for emitting a pulsed, highly precisely timed femtosecond laser having a carrier signal. As a result, a so-called frequency comb of thin sharp lines can be generated in the frequency range, which frequency comb can be used for a precise optical frequency measurement. Various approaches for the frequency-comb-based or frequency-comb-supported measurement of distances are described for example in the paper "Frequency-Comb Based Approaches to Precision Ranging Laser Radar" (N. R. Newbury, T.-A. Liu, I. Coddington, F. Giorgetta, E. Baumann, W. C. Swann; National Institute of Standards and Technology). FIG. 13 illustrates purely by way of example an interferometer unit 300 with two frequency comb laser signals 360, 370 ("dual-comb interferometer") for carrying out a combined time-of-flight and interferometric distance measurement. In this case, a first beam source 310 emits a first frequency comb signal 360. The latter is guided via a first beam splitter 330 and via a reference beam splitter 340 onto a retroreflector as measurement target 61. The combined signal 380 reflected from the measurement target 61 and reference 360 is guided onto a frequency comb analysis unit 350, where the relative arrival time of the pulses reflected from measurement target 61 and reference 360 can be used for a time-of-flight distance measurement. A reference frequency comb signal 370 which is generated by a second beam source 320 and which has a repetition rate deviating slightly from the first frequency comb signal 360 can be read in a heterodyne manner in the frequency comb analysis unit 350 together with the reflected combined signal 380 for an interferometric distance measurement. In a laser tracker according to the invention, both the first and the second distance measuring units can be designed for frequency-comb-based or frequency-comb-supported measurement of a distance to a target. Besides the embodiment illustrated purely by way of example in FIG. 13, in particular a WFD module or FMCW module according to the invention of a laser tracker can also be designed in a frequency-comb-supported manner.

It goes without saying that these illustrated figures merely schematically illustrate possible exemplary embodiments. According to the invention, the various approaches can likewise be combined with one another and also with systems and methods for measuring surfaces and/or objects and with measuring instruments from the prior art.

What is claimed is:

1. A laser tracker comprising:
a base,
a support, which is fixed on the base rotatably about a first rotation axis,
a beam directing unit, which is fixed to the support rotatably about a second rotation axis, which is substantially orthogonal to the first rotation axis,
means for detecting a rotation angle of the support relative to the base, and
means for detecting a rotation angle of the beam directing unit relative to the support,
wherein the laser tracker is configured for position determination and continuous tracking of a target comprising a retroreflector, wherein the beam directing unit comprises:
a laser emission and reception optical unit for emitting measurement radiation and for receiving measurement radiation reflections,
a first optical distance measuring unit having at least one first distance measuring device for measuring the distance to the retroreflector by means of a first measurement radiation,
a second optical distance measuring unit comprising a second beam source for emitting a second measurement radiation, a detector and a control and processing unit for measuring a distance to a diffusely scattering surface of a target object by means of the second measurement radiation, and
a beam receiving unit, which is designed to guide reflected radiation that entered the beam directing unit through the laser emission and reception optical unit to the second optical distance measuring unit, wherein:
the second beam source is designed to emit a pulsed light radiation as second measurement radiation,
a portion of the second measurement radiation that is reflected from the surface of the target object is forwardable to the detector,
the detector is designed to detect at least one pulse of the reflected portion of the second measurement radiation, and
the second optical distance measuring unit is designed to digitize the detected pulse in the context of a waveform digitizing process and to ascertain a distance to the surface of the target object on the basis of the digitized pulse.

2. The laser tracker according to claim 1, wherein:
a part of the second measurement radiation is forwardable to the detector as reference beam.

3. The laser tracker according to claim 1, wherein:
a part of the second measurement radiation is forwardable to the detector as reference beam by means of a first beam splitter provided in the beam path of the second measurement radiation in the beam directing unit.

4. The laser tracker according to claim 1, wherein:
wherein the beam receiving unit comprises a paraboloidal mirror having a parabolically designed mirror surface, wherein the paraboloidal mirror is designed to concentrate reflected radiation impinging on the mirror surface at a focal point.

5. The laser tracker according to claim 4, wherein:
wherein the paraboloidal mirror is designed to reflect reflected radiation impinging at a center of the mirror surface at an angle of 65° to 75°.

6. The laser tracker according to claim 5, wherein:
wherein the paraboloidal mirror is designed to reflect reflected radiation impinging at a center of the mirror surface at an angle of 70°.

7. The laser tracker according to claim 1, wherein at the focal point a coupling-in element is provided for coupling the concentrated reflected radiation into an optical waveguide, wherein a deflection element is provided in the beam path between the paraboloidal mirror and the coupling-in element.

8. The laser tracker according to claim 1, wherein the paraboloidal mirror is arranged outside the common beam path of the first measurement radiation and the second measurement radiation, wherein the beam receiving unit comprises a beam splitting apparatus arranged in the common beam path, for directing the reflected radiation onto the paraboloidal mirror.

9. A method for using a waveform digitizing (WFD) module in a laser tracker for providing additional measurement functionality, wherein the laser tracker is configured for position determination and continuous tracking of a target comprising a retroreflector and comprises a beam directing unit having:
a laser emission and reception optical unit for emitting measurement radiation and for receiving measurement radiation reflections,
an optical distance measuring apparatus having at least one first distance measuring device for measuring the distance to the retroreflector by means of a first measurement radiation, and
a beam receiving unit,
wherein the method comprises:
generating a pulsed light beam as second measurement radiation by means of a beam source of the WFD module,
emitting the second measurement radiation onto a target to be measured, wherein one part of the second measurement radiation is forwarded as reference beam to a detector, and another part of the second measurement radiation is emitted through the laser emission and reception optical unit,
a portion of the second measurement radiation that is reflected from the target and received through the laser emission and reception optical unit is guided by the beam receiving unit and forwarded to the detector,
the detector detects pulses of the forwarded reference beam and of the reflected portion of the second measurement radiation,
the detected pulses are digitized in the context of a waveform digitizing process of the WFD module, and
a distance to the target is ascertained on the basis of the digitized pulses.

* * * * *